US010725148B2

(12) United States Patent
Inada

(10) Patent No.: US 10,725,148 B2
(45) Date of Patent: Jul. 28, 2020

(54) APPARATUS, METHOD AND PROGRAM FOR SPATIAL POSITION MEASUREMENT

(71) Applicant: KABUSHIKI KAISHA TOSHIBA, Minato-Ku (JP)

(72) Inventor: Yohei Inada, Kawasaki (JP)

(73) Assignee: KABUSHIKI KAISHA TOSHIBA, Minato-Ku (JP)

(*) Notice: Subject to any disclaimer, the term of this patent is extended or adjusted under 35 U.S.C. 154(b) by 482 days.

(21) Appl. No.: 15/692,788

(22) Filed: Aug. 31, 2017

(65) Prior Publication Data
US 2017/0363710 A1 Dec. 21, 2017

Related U.S. Application Data

(62) Division of application No. 14/312,833, filed on Jun. 24, 2014, now Pat. No. 9,817,104.

(30) Foreign Application Priority Data

Jun. 27, 2013 (JP) ................................. 2013-135510

(51) Int. Cl.
G01S 5/00 (2006.01)
G01S 5/18 (2006.01)
G01S 11/14 (2006.01)

(52) U.S. Cl.
CPC ............... G01S 5/186 (2013.01); G01S 11/14 (2013.01)

(58) Field of Classification Search
USPC .......................................................... 367/99
See application file for complete search history.

(56) References Cited

U.S. PATENT DOCUMENTS

| 6,141,293 | A | 10/2000 | Amorai-Moriya |
| 6,470,002 | B1 | 10/2002 | Jones |
| 6,493,649 | B1 | 12/2002 | Jones |
| 6,697,300 | B1 | 2/2004 | Holt |
| 6,978,159 | B2* | 12/2005 | Feng .................... H04R 25/407 379/406.08 |
| 7,123,545 | B2 | 10/2006 | Klinnert |

(Continued)

FOREIGN PATENT DOCUMENTS

| JP | 59-77840 A | 5/1984 |
| JP | 61-296899 A | 12/1986 |

(Continued)

Primary Examiner — James R Hulka
(74) Attorney, Agent, or Firm — Oblon, McClelland, Maier & Neustadt, L.L.P.

(57) ABSTRACT

According to one embodiment, a spatial position measurement apparatus, includes: a transmission unit configured to transmit an ultrasonic wave accompanying with a transmission source identifiable from three or more transmission sensors provided on a first object; a detection unit configured to detect the ultrasonic wave received by two or more reception sensors provided on a second object; a distance calculation unit configured to calculate distances between the transmission sensors and the reception sensors based on propagation time of the ultrasonic wave; and a coordinate calculation unit configured to calculate, in a coordinate system where a position of one group out of a group of the transmission sensors and a group of the reception sensors is fixed, positional coordinates of another group based on the distances.

5 Claims, 8 Drawing Sheets

(56) References Cited

U.S. PATENT DOCUMENTS

| | | |
|---|---|---|
| 8,174,934 B2 | 5/2012 | Li |
| 2005/0052950 A1 | 3/2005 | Klinnert |
| 2008/0297412 A1 | 12/2008 | Hamada |
| 2009/0167607 A1* | 7/2009 | Holder .................. G01S 13/003 |
| | | 342/453 |
| 2009/0226034 A1 | 9/2009 | Seki |
| 2009/0262604 A1 | 10/2009 | Funada |
| 2010/0106297 A1 | 4/2010 | Inazumi |
| 2011/0026363 A1 | 2/2011 | Lavache |
| 2011/0170374 A1 | 7/2011 | Miyachi |
| 2012/0026837 A1 | 2/2012 | Li |
| 2012/0147706 A1 | 6/2012 | Kato |

FOREIGN PATENT DOCUMENTS

| | | |
|---|---|---|
| JP | 5-329160 A | 12/1993 |
| JP | 6-82242 A | 3/1994 |
| JP | 8-206116 A | 8/1996 |
| JP | 2000-88960 | 3/2000 |
| JP | 2005-26667 A | 1/2005 |
| JP | 2006-58205 A | 3/2006 |
| JP | 2008-298607 | 12/2008 |
| JP | 2009-217490 | 9/2009 |

* cited by examiner $$\frac{\partial r_{ij}}{\partial x_i} = \frac{-(X_j - x_{i\text{-}0})}{\sqrt{(X_j - x_{i\text{-}0})^2 + (Y_j - y_{i\text{-}0})^2 + (Z_j - z_{i\text{-}0})^2}} = \alpha_{ij} \quad (5a)$$

$$\frac{\partial r_{ij}}{\partial y_i} = \frac{-(Y_j - y_{i\text{-}0})}{\sqrt{(X_j - x_{i\text{-}0})^2 + (Y_j - y_{i\text{-}0})^2 + (Z_j - z_{i\text{-}0})^2}} = \beta_{ij} \quad (5b)$$

$$\frac{\partial r_{ij}}{\partial z_i} = \frac{-(Z_j - z_{i\text{-}0})}{\sqrt{(X_j - x_{i\text{-}0})^2 + (Y_j - y_{i\text{-}0})^2 + (Z_j - z_{i\text{-}0})^2}} = \gamma_{ij} \quad (5c)$$

$$\begin{pmatrix} \Delta r_{i1} \\ \Delta r_{i2} \\ \Delta r_{i3} \end{pmatrix} = \begin{pmatrix} \alpha_{i1} & \beta_{i1} & \gamma_{i1} \\ \alpha_{i2} & \beta_{i2} & \gamma_{i2} \\ \alpha_{i3} & \beta_{i3} & \gamma_{i3} \end{pmatrix} \begin{pmatrix} \Delta x_i \\ \Delta y_i \\ \Delta z_i \end{pmatrix} \quad (6a)$$

$$\begin{pmatrix} \Delta x_i \\ \Delta y_i \\ \Delta z_i \end{pmatrix} = \begin{pmatrix} \alpha_{i1} & \beta_{i1} & \gamma_{i1} \\ \alpha_{i2} & \beta_{i2} & \gamma_{i2} \\ \alpha_{i3} & \beta_{i3} & \gamma_{i3} \end{pmatrix}^{-1} \begin{pmatrix} \Delta r_{i1} \\ \Delta r_{i2} \\ \Delta r_{i3} \end{pmatrix} \quad (6b)$$

$$\theta = \cos^{-1}\left(\frac{n_1 . n_2}{|n_1||n_2|}\right) \quad (11a)$$

$$= \cos^{-1}\left(\frac{ae + bf + cg}{\sqrt{a^2 + b^2 + c^2}\sqrt{e^2 + f^2 + g^2}}\right) \quad (11b)$$

APPARATUS, METHOD AND PROGRAM FOR SPATIAL POSITION MEASUREMENT

CROSS-REFERENCE TO RELATED APPLICATIONS

The present divisional Applications claims the benefit of priority under 35 U.S.C. § 120 to application Ser. No. 14/312,833, filed on Jun. 24, 2014 and claims the benefit of priority from Japanese Patent application No. 2013-135510, filed on Jun. 27, 2013, the entire contents of each of both which are incorporated herein by reference.

BACKGROUND OF THE INVENTION

Field of the Invention

The present invention relates to a technology for measuring a relative positional relation between two objects which are present in space.

Description of the Related Art

As a technology for measuring a position of an object which is present in space, a Global Positioning System (GPS) using radio waves and a technology using image analysis are widely known (Japanese Patent Laid-Open No. 2008-298607 and Japanese Patent Laid-Open No. 2009-217490).

GPS uses radio waves having a velocity of light as an information transmission medium. Accordingly, clock frequencies used in personal computers and/or D-A converters, which are popularized today, are insufficient to perform accurate measurement of a distance between a receiver and a transmitter which are placed in very close range, on the order of a millimeter or less, based on arrival time of the radio waves.

In the position measuring technology using image analysis, a computer performs arithmetic processing of an image taken with a CCD camera and the like. This requires a large-scale optical measurement system, so that a computer has a high arithmetic processing load, resulting in a problem of limited real-time processing.

SUMMARY OF THE INVENTION

The present invention has been made in consideration of such circumstances, and an object of the present invention is to provide a spatial position measuring technology which is configured to recognize a relative position of two objects in a very close range in real time and which is implementable at a small scale.

The present invention provides a spatial position measuring technology which is configured to recognize in real time a relative position of two objects in a very close range and which is implementable at a small scale.

There is provided a spatial position measurement apparatus, includes: a transmission unit configured to transmit an ultrasonic wave accompanying with a transmission source identifiable from three or more transmission sensors provided on a first object; a detection unit configured to detect the ultrasonic wave received by two or more reception sensors provided on a second object; a distance calculation unit configured to calculate distances between the transmission sensors and the reception sensors based on propagation time of the ultrasonic wave; and a coordinate calculation unit configured to calculate, in a coordinate system where a position of one group out of a group of the transmission sensors and a group of the reception sensors is fixed, positional coordinates of another group based on the distances.

According to the embodiment of the present invention having the above features provides a spatial position measuring technology which is configured to recognize in real time a relative position of two objects in a very close range and which is implementable at a small scale.

BRIEF DESCRIPTION OF THE DRAWINGS

FIG. 6 illustrates arithmetic expressions;

DETAILED DESCRIPTION OF THE PREFERRED EMBODIMENTS

First Embodiment

The embodiments of the present invention will be described hereinbelow with reference to the accompanying drawings.

Figure 1:
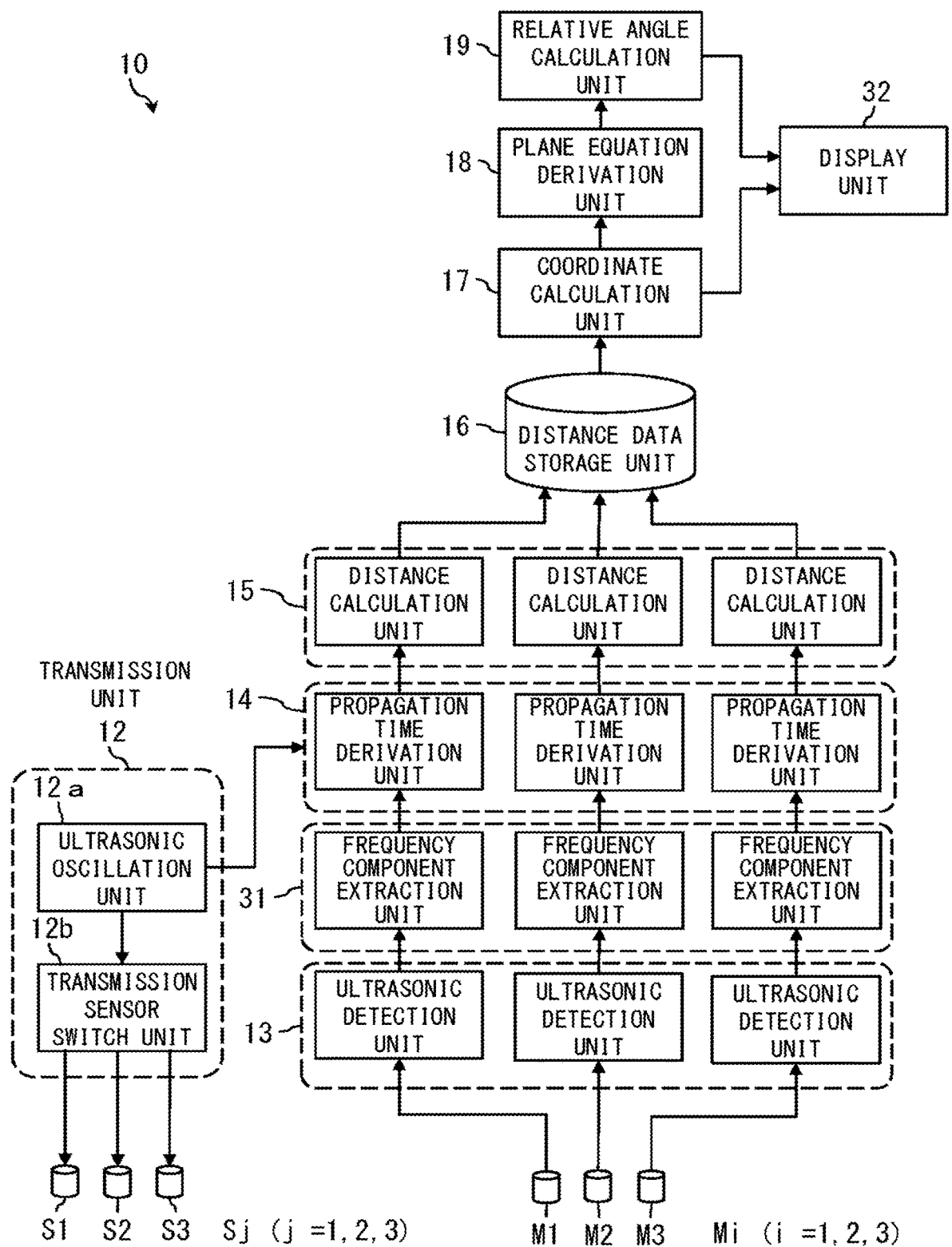
FIG. 1 is a block diagram illustrating a first embodiment of a spatial position measurement apparatus according to the present invention.
Figure 2:
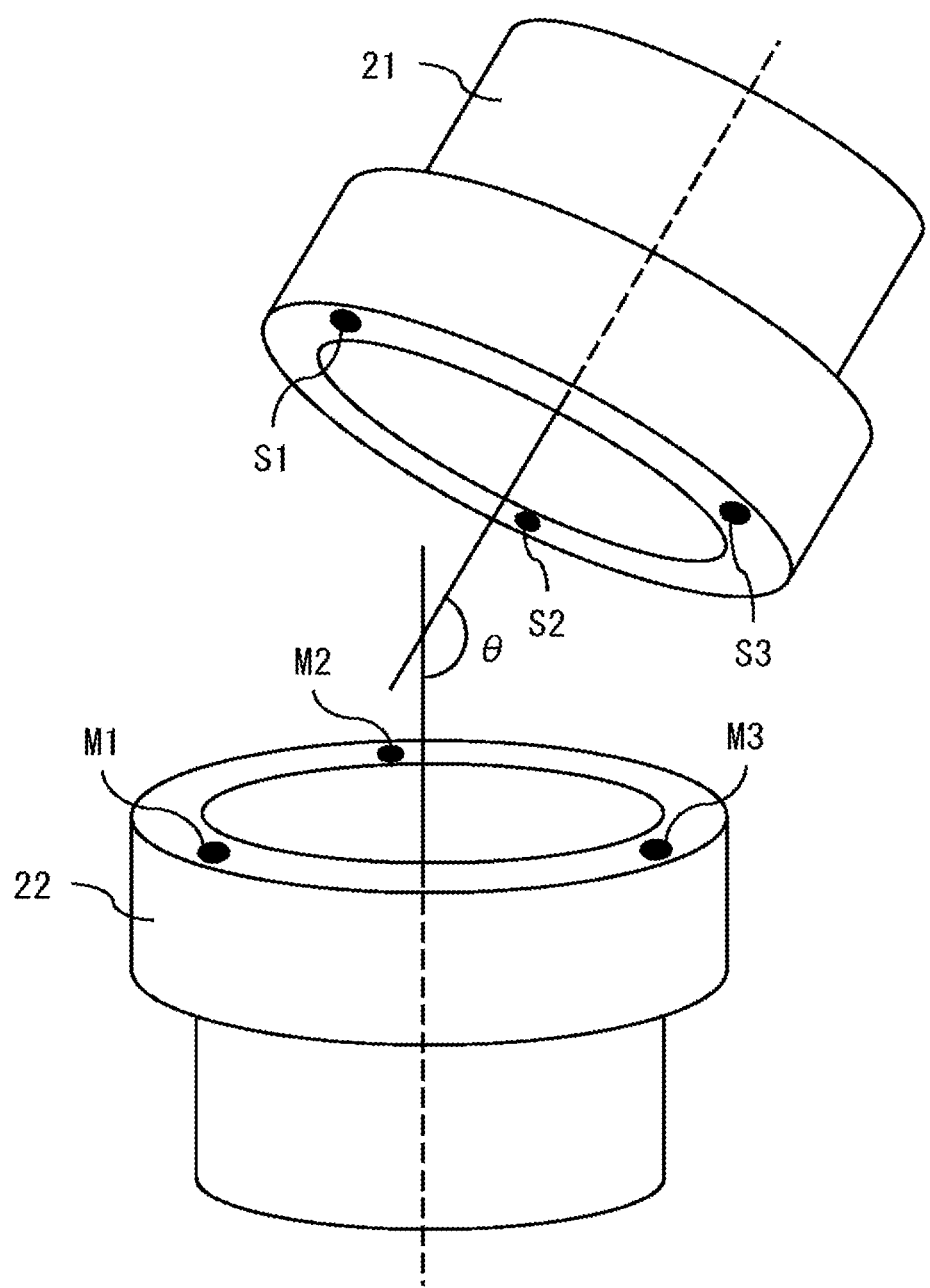
FIG. 2 is an external view illustrating the spatial position measurement apparatus according to the first embodiment.

As illustrated in FIG. 1, a spatial position measurement apparatus 10 according to the first embodiment includes a transmission unit 12, a detection unit 13, a distance calculation unit 15, and a coordinate calculation unit 17. The transmission unit 12 is configured to transmit an ultrasonic wave accompanying with a transmission source identifiable from three or more transmission sensors $S_j$ (j=1, 2, 3) provided on a first object 21 (FIG. 2). The detection unit 13 is configured to detect the ultrasonic wave received by two or more reception sensors $M_i$ (i=1, 2, 3) provided on a second object 22 (FIG. 2). The distance calculation unit 15 is configured to calculate distances $r_{i,j}$ (FIG. 3) between the transmission sensors $S_j$ and the reception sensors $M_i$ based on propagation times $t_{i,j}$ (FIG. 4) of the ultrasonic wave derived by a derivation unit 14, and stores the distances $r_{i,j}$ in a storage unit 16. The coordinate calculation unit 17 is configured to calculate, in a coordinate system where a position of one group out of a group of the transmission sensors $S_j$ (j=1, 2, 3) and a group of the reception sensors $M_i$ (i=1, 2, 3) is fixed, positional coordinates of another group based on the distances $r_{i,j}$.

The spatial position measurement apparatus 10 further includes a derivation unit 18 configured to derive an equation of a plane including positional coordinates of the group of the transmission sensors $S_j$ (j=1, 2, 3), and the group of the reception sensors $M_i$ (i=1, 2, 3), and a relative angle calculation unit 19 configured to calculate a relative angle θ between the first object 21 and the second object 22 based on the plane equation.

The spatial position measurement apparatus 10 further includes an extraction unit 31 configured to extract a specific frequency component of the ultrasonic wave received by the reception sensors $M_i$ (i=1, 2, 3). The propagation times $t_{i,j}$ are determined based on reception intensity of a main frequency component of the ultrasonic wave which propagates through a medium (air) present between the first object 21 and the second object 22.

As illustrated in FIG. 2, examples of the first object 21 and the second object 22 include pipes, expansion joints, beams, and plate members fixed to buildings, such as plant facilities, houses, and office buildings. The spatial position measurement apparatus 10 is used to acquire information necessary to recognize a relative positional relation between these two objects 21 and 22 and to align their abutting surfaces.

For example, in scenes of installing pipes and/or beams in plant construction sites and the like, surfaces of the beams and/or the piping flanges are sometimes displaced from assumed positions due to failures in implementation, integrated tolerances, and the like.

In order to correct failures and restore a normal state in installation, it is first required to accurately grasp a failure state in a short period of time. In radiation controlled areas such as nuclear power plants in particular, reduction in exposure dose of an operator is achieved by reducing time taken for correcting displacement (core deviation) of devices and/or for performing alignment of devices.

After installing the transmission sensors $S_j$ (j=1, 2, 3) and the reception sensors $M_i$ (i=1, 2, 3) of the spatial position measurement apparatus 10 in each of the first object 21 and the second object 22, the operator can move to a low dosage location and remotely perform high-precision real-time measurement.

The transmission unit 12 is made up of an oscillation unit 12a configured to output an electrical signal that causes the transmission sensors $S_j$ to oscillate an ultrasonic wave, and a switch unit 12b configured to switch and guide the electrical signal to the transmission sensors $S_j$. The transmission sensors $S_j$ (j=1, 2, 3), which sequentially receive an electrical signal input from the switch unit 12b, transmit an ultrasonic wave of a peculiar frequency in synchronization with an input timing of the electrical signal. As a consequence, the reception sensors $M_i$ can identify the transmission sensors $S_j$ as a transmission source of the ultrasonic wave based on a receiving timing.

The ultrasonic wave may be subjected to any one of Amplitude Modulation (AM), Frequency Modulation (FM), Code Division Multiple Access (CDMA) modulation, Time Division Multiple Access (TDMA) modulation, and Frequency Division Multiple Access (FDMA) modulation, so that information on transmission time of an ultrasonic wave and/or identification information of the transmission sensor $S_j$ may be carried in the wave.

In this case, the reception sensors $M_i$ (i=1, 2, 3) can identify a transmission sensors $S_j$ that is a transmission source of the received ultrasonic wave based on the identification information carried therein. This makes the switch unit 12b unnecessary.

Figure 3:
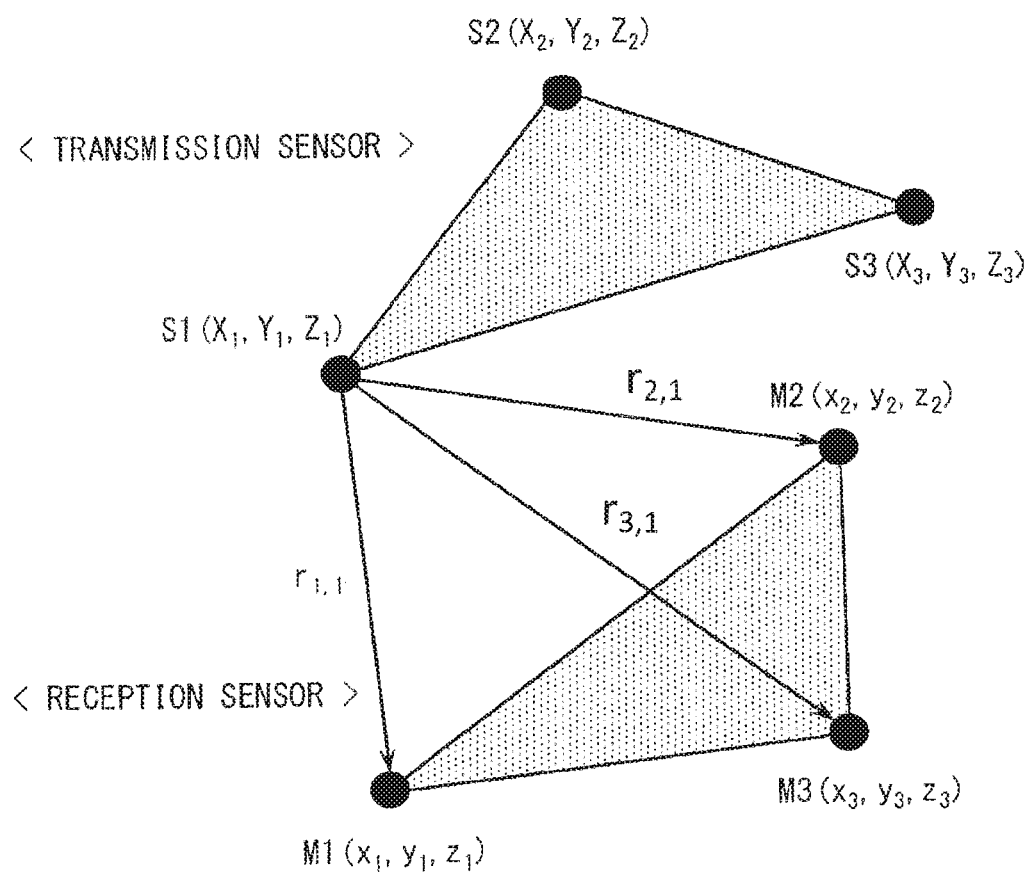
FIG. 3 is an explanatory view illustrating a principle of spatial position measurement.

As illustrated in FIG. 3, an ultrasonic wave transmitted from any one transmission sensor $S_1$ propagates through a medium (air or liquid) which is present between the first object 21 and the second object 22, and is input into all the reception sensors $M_i$ (i=1, 2, 3).

Based on a later-described arithmetic expressions, distances $r_{1,1}$, $r_{1,2}$, and $r_{1,3}$ between the transmission sensor $S_1$ and all the reception sensors $M_i$ (i=1, 2, 3) are calculated.

Similarly, distances $r_{2,1}$, $r_{2,2}$, $r_{2,3}$, $r_{3,1}$, $r_{3,2}$, and $r_{3,3}$ (illustration omitted) between the transmission sensors $S_2$ and $S_3$ and the reception sensors $M_i$ (i=1, 2, 3) are calculated based on the ultrasonic waves transmitted from the transmission sensors $S_2$ and $S_3$.

Based on the thus-calculated plurality of distances $r_{i,j}$, a relative positional relation between one group out of a group of the transmission sensors $S_j$ and a group of the reception sensors $M_i$ and another group is derived.

In the present embodiment, three transmission sensors $S_j$ are provided on an identical plane and three reception sensors $M_i$ are provided on an identical plane. However, more sensors may be provided on each of the identical planes.

To derive only a directional relation between the first object 21 and the second object 22, at least three transmission sensors $S_j$ and at least two reception sensors $M_i$ may be provided. In other words, the reception sensors may be configured as $M_i$ (i=1, 2).

Figure 4A:
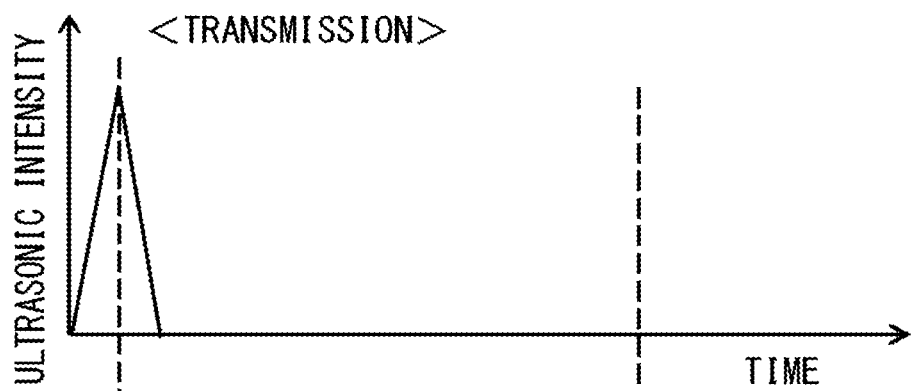
FIGS. 4A and 4B are explanatory views illustrating derivation of propagation time of an ultrasonic wave.
Figure 4B:
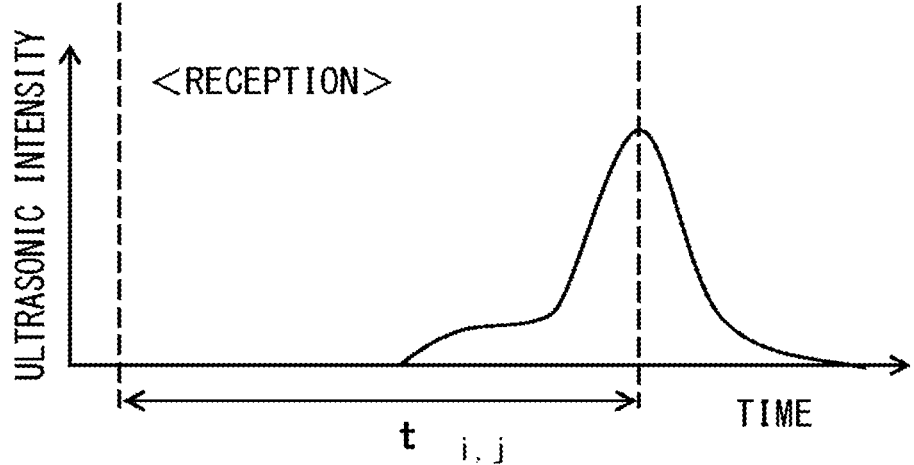

FIG. 4(A) illustrates a waveform of an ultrasonic wave transmitted from the transmission sensors $S_j$, while FIG. 4B illustrates a waveform of the ultrasonic wave received by the reception sensors $M_i$ and detected by the detection unit 13.

The propagation time derivation unit 14 (FIG. 1) derives propagation times $t_{i,j}$ of ultrasonic waves from the transmission sensors $S_j$ to the reception sensors $M_i$, from a peak in waveform of the ultrasonic waves on the transmitting side and a peak in wavefoi in of the ultrasonic waves on the receiving side.

The distance calculation unit 15 inputs the propagation times $t_{i,j}$ of the ultrasonic waves, multiplies the propagation times $t_{i,j}$ by an acoustic velocity (v+αT) expressed by a function of temperature T based on a following expression (1) (where a represents a coefficient), and calculates distances $r_{i,j}$ from the transmission sensors $S_j$ to the reception sensors $M_i$.

The distance calculation unit 15 calculates the distances $r_{i,j}$ for combinations of all the transmission sensors $S_j$ and reception sensors $M_i$, and store them in the storage unit 16.

$$r_{i,j} = (v + \alpha T) t_{i,j} \quad (1)$$

When attention is focused on the reception wavefo in of the ultrasonic wave in FIG. 4B, a broad base portion of the waveform is observed as compared with the transmission waveform of the ultrasonic wave in FIG. 4(A).

This is because in addition to a direct propagation path of the ultrasonic wave from the transmission sensor $S_j$ to the reception sensor Mi, a propagation path that travels along the surface of the first object 21 or the second object 22 is present and an echo effect is provided by reflected waves.

More specifically, the ultrasonic wave propagates at a higher velocity and tends to attenuate less at the time of passing through a medium in a solid form than at the time of passing through a medium in a gaseous or liquid form. This is the reason why the reception waveform tends to be broader.

As the reception waveform becomes broader, derivation accuracy of the propagation time $t_{i,j}$ of the ultrasonic wave is degraded.

For example, while a propagation velocity of the ultrasonic wave in the air is about 331.45+0.6 T[m/S] (where T[K] represents absolute temperature of air), the propagation velocity is known to be 15 times higher in a metal solid than in the air.

Accordingly, the transmission sensors $S_j$ or the reception sensors $M_i$ are provided on the first object 21 or the second object 22 through a member (illustration omitted) which suppresses propagation of the ultrasonic wave.

Specific examples of the member to suppress propagation of the ultrasonic wave include rubber.

The ultrasonic wave forms only a dilatational wave (longitudinal wave) within the gas. However, when the ultrasonic wave enters into an elastic body such as metal, a transverse wave is simultaneously formed, and by the time the ultrasonic wave reaches the reception sensors $M_i$, a complicated waveform is formed.

Figure 5:
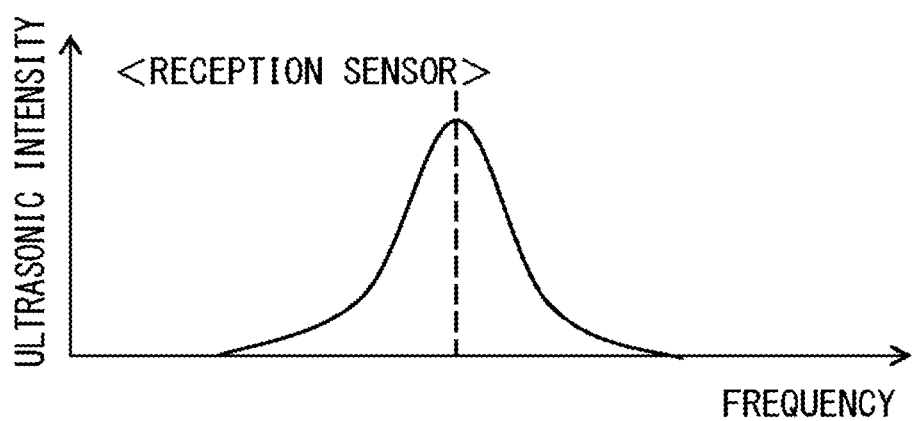
FIG. 5 is a graph view illustrating a frequency spectrum of a received ultrasonic wave.

As a result, a frequency spectrum of the ultrasonic wave received by the reception sensors $M_i$ shows a broad form as illustrated in FIG. 5.

Accordingly, a frequency component extraction unit 31 is provided prior to the propagation time derivation unit 14.

A specific frequency component of the ultrasonic wave detected by the detection unit 13 is extracted, and based on reception intensity of the frequency component, the propagation time $t_{i,j}$ is determined.

The frequency component to be extracted is a main frequency component of the ultrasonic wave which propagates through a medium (air or liquid) present between the first object 21 and the second object 22. The frequency component is extracted by performing Fast Fourier transform (FFT) analysis on the waveform of the ultrasonic wave detected by the detection unit 13.

The coordinate calculation unit 17 is configured to calculate, in a coordinate system where a position of one group out of a group of the transmission sensors $S_j$ (j=1, 2, 3) and a group of the reception sensors $M_i$ (i=1, 2, 3) is fixed, positional coordinates of another group based on the distances $r_{i,j}$.

When coordinates of the transmission sensors $S_j$ are set to $(X_j, Y_j, Z_j)$ and coordinates of the reception sensors $M_i$ are set to $(x_i, y_i, z_i)$, distances $r_{i,j}$ between both the coordinates are expressed as in a following expression (2):

$$r_{i,j} = \sqrt{\{(X_j-x_i)^2+(Y_j-y_i)^2+(Z_j-z_i)^2\}} \quad (2)$$

When the coordinates $(X_j, Y_j, Z_j)$ of the transmission sensors $S_j$ are fixed (constants) and the coordinates $(x_i, y_i, z_i)$ of the reception sensors $M_i$ are arithmetic objects (variables) in this equation, these coordinate variables $(x_i, y_i, z_i)$ are derived, for example, by a sequential computation method (Newton's method) outlined below.

The coordinate variables $(x_i, y_i, z_i)$ are each expressed as a sum of each initial value $(x_{i-0}, y_{i-0}, z_{i-0})$ and each corrected value $(\Delta x_i, \Delta y_i, \Delta z_i)$ in following expressions (3a), (3b), and (3c):

$$x_i = x_{i-0} + \Delta x_i \quad (3a)$$

$$y_i = y_{i-0} + \Delta y_i \quad (3b)$$

$$z_i = z_{i-0} + \Delta z_i \quad (3c)$$

An approximate expression (linearization expression) in the form of a following expression (4a) is introduced. This expression expresses a difference between the expression (1) and the expression (2), and therefore, the expression (4a) is equal to the expression (4b):

$$\Delta r_{ij} = \delta r_{ij}/\delta x_i \cdot \Delta x_i + \delta r_{ij}/\delta y_i \cdot \Delta y_i + \delta r_{ij}/\delta z_i \cdot \Delta z_i \quad (4a)$$

$$= r_{ij} - \sqrt{\{(X_j - x_{i-0})^2 + (Y_j - y_{i-0})^2 + (Z_j - z_{i-0})^2\}} \quad (4b)$$

Partial differential terms which appear in the expression (4a) are obtained by partially differentiating the expression (2), by which expressions (5a), (5b), and (5c) illustrated in FIG. 6 are derived.

For the transmission sensors $S_j$ (j=1, 2, 3), the expression (4a) is expressed as a determinant (6a) in FIG. 6, which is further expanded in the form of a determinant (6b).

Variables $(\Delta x_i, \Delta y_i, \Delta z_i)$ obtained by the determinant (6b) of FIG. 6 are substituted in the expressions (3a), (3b), and (3c) to derive coordinate variables $(x_i, y_i, z_i)$.

The coordinate variables $(x_i, y_i, z_i)$ derived in this way are replaced with initial values $(x_{i-0}, y_{i-0}, z_{i-0})$, and calculation of the expressions (5) and (6) are repeated until variables $(\Delta x_i, \Delta y_i, \Delta z_i)$ become less than a specified value and convergence occurs (for example, convergence of the variables is determined at the time when the variables reach $|\Delta x_i|<1$ mm, $|\Delta y_i|<1$ mm, and $|\Delta z_i|, <1$ mme, where 1 mm is a specified value).

Although the expressions (3) to (6) are described for the entire group of the reception sensors $M_i$ for descriptive purposes, each calculation of the reception sensors $M_i$ is independently performed in parallel with each other. In short, in convergence calculation for $M_1$, $M_2$, and $M_3$, the number of repetitions of the calculation as well as the time necessary for the calculation may be different from each other. Therefore, in order to keep precise values in two or three coordinates of the reception sensors $M_i$ at the same time, a fixed time constant is needed.

The coordinate variables $(x_i, y_i, z_i)$ obtained as a result of such repeated calculation is used as an output of the coordinate calculation unit 17 (FIG. 1).

Figure 9:
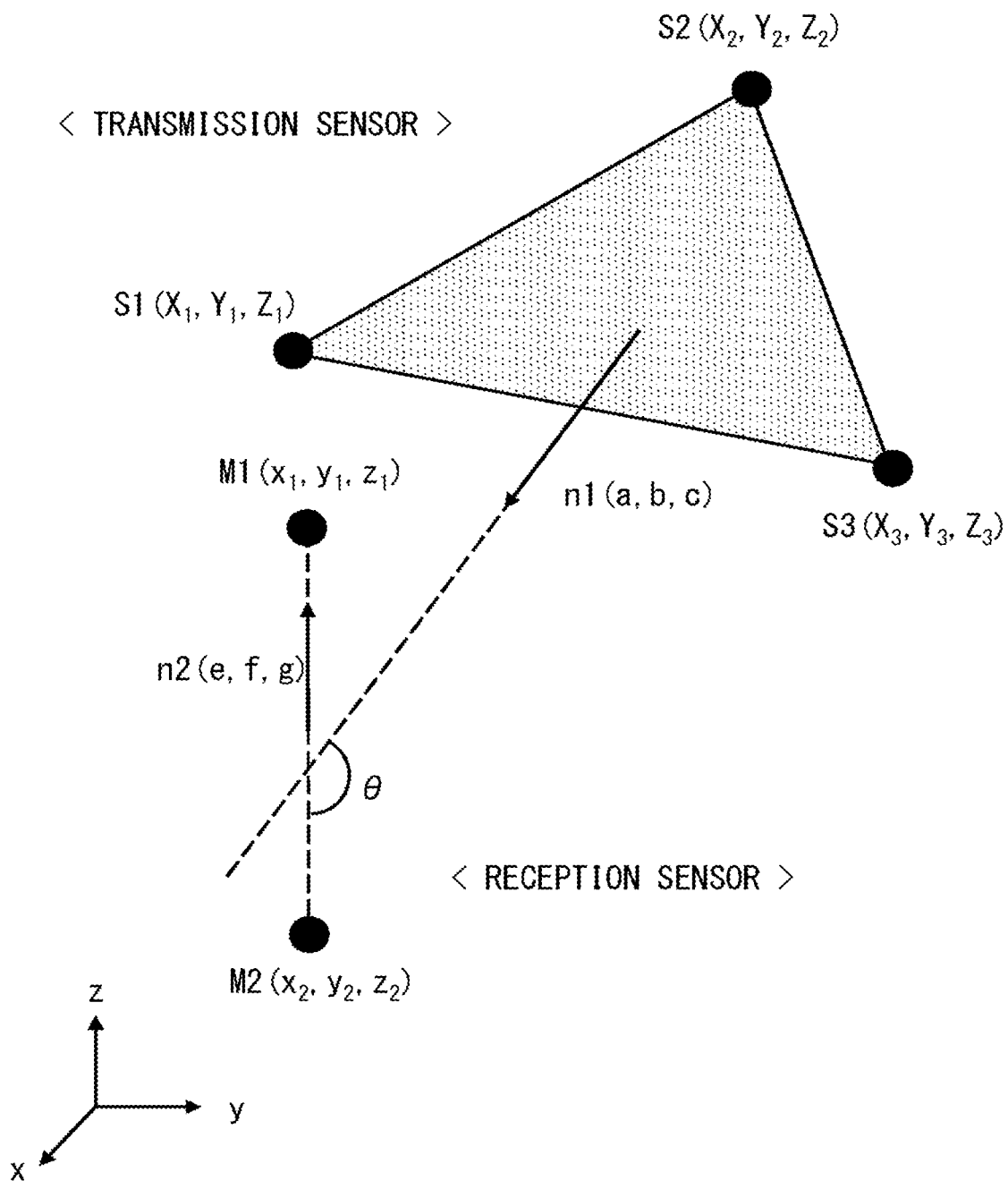
FIG. 9 is an explanatory view illustrating a linear equation of space.

As illustrated in FIG. 9, when space coordinate variables $(x_1, y_1, z_1)$ and $(x_2, y_2, z_2)$ of at least two reception sensors $M_i$ (i=1, 2) are calculated, a linear equation of space may be obtained in the form of a straight line: $(x, y, z)=(x_1, y_1, z_1)+t(x_2-x_1, y_2-y_1, z_2-z_1)$ where t represents a parameter, and $(x_2-x_1, y_2-y_1, z_2-z_1)$ represents a linear direction vector.

The plane equation derivation unit 18 derives an equation of a plane which includes the group of the reception sensors $M_i$ based on the coordinates $(x_i, y_i, z_i)$ (i=1, 2, 3) output from the coordinate calculation unit 17. The plane equation derivation unit 18 also derives an equation of a plane which includes the group of the transmission sensors $S_j$ based on the coordinates $(X_j, Y_j, Z_j)$ (j=1, 2, 3).

Here, when the equation of the plane including the group of the transmission sensors $S_j$ is set as a following expression (7), coefficients (a, b, c, d) serve as a solution of following simultaneous equations (8a), (8b), and (8c):

$$aX+bY+cZ+d=0 \quad (7)$$

$$aX_1+bY_1+cZ_1+d=0 \quad (8a)$$

$$aX_2+bY_2+cZ_2+d=0 \quad (8b)$$

$$aX_3+bY_3+cZ_3+d=0 \quad (8c)$$

Similarly, when the equation of the plane including the group of the reception sensors $M_i$ is set as a following expression (9), coefficients (e, f, g, h) serve as a solution of following simultaneous equations (10a), (10b), and (10c):

$$eX+fY+gZ+h=0 \quad (9)$$

$$eX_1+fY_1+gZ_1+h=0 \quad (10a)$$

$$eX_2+fY_2+gZ_2+h=0 \quad (10b)$$

$$eX_3+fY_3+gZ_3+h=0 \quad (10c)$$

The relative angle calculation unit 19 calculates a relative angle θ between the first object 21 and the second object 22 based on the plane equations (7) and (9).

Here, a normal vector $n_1$ of the equation of the plane including the group of the transmission sensors $S_j$ is expressed by (a, b, c), and a normal vector $n_2$ of the equation of the plane including the group of the reception sensors $M_i$ is expressed by (e, f, g).

Further, since the relative angle θ between the first object 21 and the second object 22 is expressed as a crossed axes angle between these two normals $n_1$ and $n_2$, the relative angle θ is calculated in accordance with expressions (11a) and (11b) in FIG. 6.

A crossed axes angle with a linear equation is also similarly calculated. A normal vector $n_1$ of the equation of the plane including the group of the transmission sensors $S_j$ is expressed by (a, b, c), and a linear direction vector is expressed by (e, f, g)=$(x_2-x_1, y_2-y_1, z_2-z_1)$, which calculates a positional relation between the plane including the group of the transmission sensors $S_j$ and the obtained straight line as in the case of the above-stated crossed axes angle.

Figure 7:
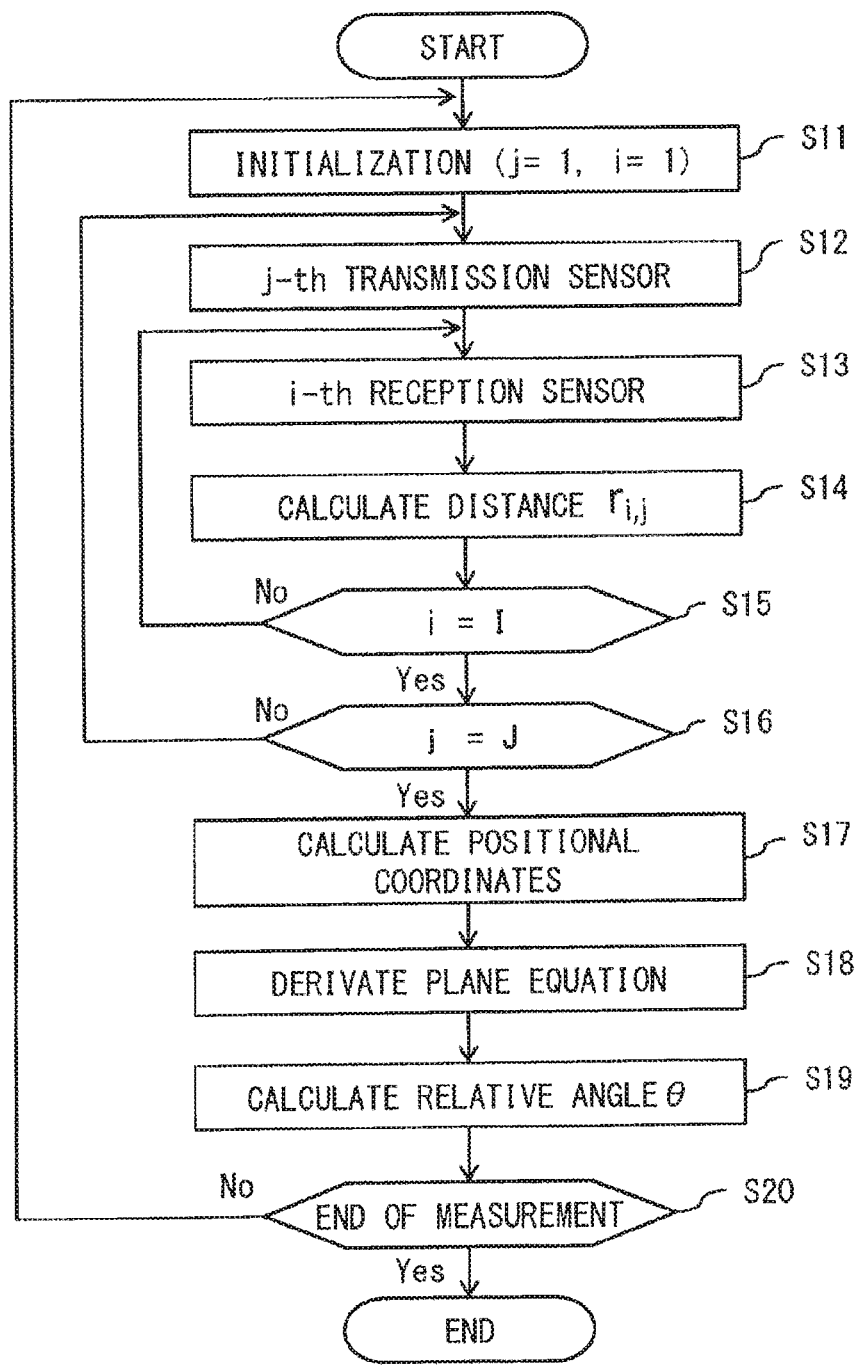
FIG. 7 is a flow chart explaining operation of the spatial position measurement apparatus according to the first embodiment.

Based on a flow chart of FIG. 7, operation of the spatial position measurement apparatus according to each embodiment will be described (see FIGS. 1 and 2 as appropriate).

An ultrasonic wave is first transmitted from the first transmission sensor $S_1$ out of the plurality of transmission sensors $S_j$ (j=1 to J) provided on the first object 21 (S11, S12).

The transmitted ultrasonic wave is received by all the reception sensors $M_i$ (i=1 to I) provided on the second object 22. Based on each propagation time $t_{i,1}$, each distance $r_{i,1}$ from the transmission sensor $S_1$ to the reception sensors $M_i$ (i=1 to I) is calculated (S13 to S15).

An ultrasonic wave is also transmitted from the second to the J-th transmission sensors $S_j$ (j=2 to J) in order, and each distance $r_{i,j}$ to the reception sensors $M_i$ (i=1 to I) is calculated (S16).

A position of one group out of a group of the transmission sensor $S_j$ (j=1 to J) and a group of the reception sensor $M_i$ (i=1 to I) is fixed in a coordinate system, and based on each calculated distance $r_{i,j}$ (i=1 to I, j=1 to J), positional coordinates of another group are calculated (S17).

An equation of a plane including the coordinates of the group of the transmission sensors $S_j$ $(X_j, Y_j, Z_j)$ (j=1 to J) is derived, and an equation of a plane including the coordinates of the group of the reception sensors $M_i$ $(x_i, y_i, z_i)$ (i=1 to I) is derived (S18).

In this case, four or more transmission sensors $S_j$ may be attached to a certain plane and four or more reception sensors $M_i$ may be attached to another plane. This makes it possible to adopt overdetermination by using a least square method in calculation of the plane equation and to thereby enhance calculation accuracy of the plane equation.

Based on the normal $n_1$ of the equation of the plane including the group of the transmission sensors $S_j$, and the normal $n_2$ of the equation of the plane including the group of the reception sensors $M_i$, a relative angle θ between the first object 21 and the second object 22 is calculated (S19).

By repeating the operation of (S12) to (S19) until measurement is ended, a relative position relation between the first object 21 and the second object 22 in space can be grasped in real time (S20, END).

Second Embodiment

Figure 8:
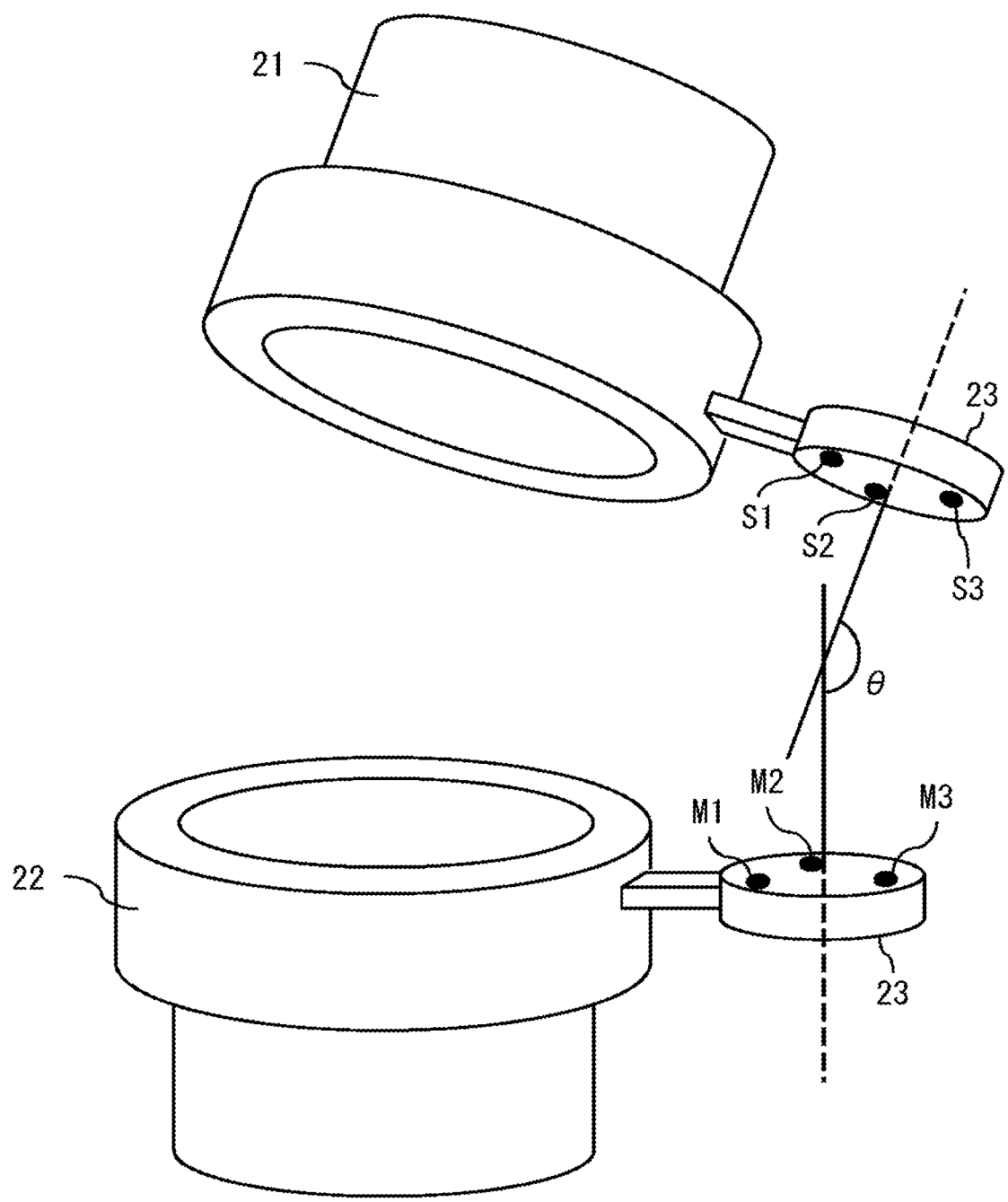
FIG. 8 is an external view illustrating a spatial position measurement apparatus according to a second embodiment.

Referring to FIG. 8, a spatial position measurement apparatus according to the second embodiment will be described.

In the spatial position measurement apparatus according to the second embodiment, a group of the transmission sensors $S_j$ and a group of the reception sensors $M_i$ are each placed on attachments 23, which are detachably attached to the first object 21 and the second object 22, respectively.

Component members in FIG. 8 identical to or having a function identical to those in FIG. 2 are designated with identical reference numerals to omit redundant description.

The attachments 23 facilitate mounting of the group of the transmission sensors $S_j$ and the group of the reception sensors $M_i$ on the first object 21 and the second object 22.

Hereinafter, examples of other applications of the spatial position measurement apparatuses according to the respective embodiments will be described.

(1) To secure reproducibility and real time control of incident angles of wedding rods for use in metal welding and to enhance manufacturing reproducibility.

(2) To grasp position, angle, and direction states of suspensions provided on a driving unit of automobiles, universal joints, and movable joint units provided on robots.

(3) To input position, angle, and direction information in data input tools for a Computer Aided Design (CAD) system.

(4) To input position, angle, and direction information in operation tools (controllers) for three-dimensional information pointers in computer systems and/or computer game systems.

(5) To enhance imaging flexibility to implement observation while arranging a probe at any position, at any angle and in any direction in an ultrasonic Testing (UT) system.

(6) To enhance imaging flexibility to implement observation while arranging CCD cameras and/or CMOS cameras at any position, at any angle, and in any direction in a Visual Testing (VT) system.

(7) Eddy Current Testing (ET) system to implement measurement at any position, at any angle, and in any direction.

(8) Radiographic Testing (RT) system to implement measurement at any position, at any angle, and in any direction.

(9) To enhance reproducibility of positions, angles, and directions in installation of observation apparatuses, such as optical cameras (including television cameras), microscopes, telescopes, prisms, mirrors, top ends of optical fiber cables, radar transmitters, laser transmitters, radiation counters, photomultiplier tubes, and spectroscopes (gratings).

(10) Real time control on positions, angles, and directions (orientation) in observation apparatuses, such as optical cameras (including television cameras), microscopes, telescopes, prisms, mirrors, top ends of optical fiber cables, radar transmitters, laser transmitters, radiation counters, photomultiplier tubes, and spectroscopes (gratings).

(11) To enhance imaging flexibility by taking images while arranging mechanical trajectories of an irradiation head and/or an intensifier (such as Geiger-Muller counters and scintillation detectors) in X-ray (gamma ray and neutron ray) CT systems at any position, at any angle, and in any direction without limiting the mechanical trajectories to circular trajectories.

(12) To enhance imaging flexibility by performing observation while arranging nuclear magnetic resonators and/or intensifiers (such as radio receivers) at any position, at any angle, and in any direction in an MRI system.

According to the spatial position measurement apparatus in at least one of the above-described embodiments, distance measurement with ultrasonic waves makes it possible to recognize a relative position of two objects in very close range in real time and to implement the apparatus at small scale.

It should be noted that, although some embodiments of the present invention have been described above, these embodiments are presented as examples, and are not intended to limit the scope of the invention. These embodiments can be implemented in other various forms, and various abbreviations, exchanges, changes and combinations can be made within a scope not deviating from the essence of the invention. These embodiments and their modifications are included in the scope and the essence of the invention, and are included in the invention described in the claims, and the equal scope thereof.

Also, components of the spatial position measurement apparatus can be implemented by a processor of a computer and operated by a spatial position measurement program.

What is claimed is:

1. A spatial position measurement apparatus, comprising:
   a transmission unit configured to transmit ultrasonic waves from a plurality of transmission sources provided on a first object;
   a detection unit configured to detect the transmitted ultrasonic waves received by a plurality reception sensors provided on a second object; and
   circuitry configured to:
   calculate, based on propagation times of the ultrasonic waves from the transmission sources to the reception sensors, distances between each of the transmission sources and the reception sensors,
   calculate positional coordinates of the transmission sources and the reception sensors based on the calculated distances between each of the transmission sources and the reception sensors,
   derive an equation of a plane including the calculated positional coordinates of the transmission sources and a linear equation including the calculated positional coordinates of the reception sensors, and
   calculate a relative angle between the first object and the second object, the relative angle calculated as a crossed axes angle between a normal vector of the equation of the plane and a linear direction vector of the linear equation.

2. The spatial position measurement apparatus according to claim 1, wherein the circuitry is further configured to:
   extract a frequency component of an ultrasonic wave received by the reception sensors, wherein
   a propagation time is determined based on reception intensity of the frequency component of the ultrasonic wave which propagates through a medium present between the first object and the second object.

3. The spatial position measurement apparatus according to claim 1, wherein
   the transmission sources are provided on the first object through a member configured to suppress propagation of the ultrasonic waves to the first object.

4. The spatial position measurement apparatus according to claim 1, wherein
   the transmission sources and the reception sensors are placed on attachments detachably attached to the first object and the second object, respectively.

5. A method for spatial position measurement, the method comprising:
   transmitting ultrasonic waves from a plurality of transmission sources provided on a first object;
   detecting the transmitted ultrasonic waves received by a plurality reception sensors provided on a second object;
   calculating, based on propagation times of the ultrasonic waves from the transmission sources to the reception sensors, distances between each of the transmission sources and the reception sensors;
   calculating positional coordinates of the transmission sources and the reception sensors based on the calculated distances between each of the transmission sources and the reception sensors;
   deriving an equation of a plane including the calculated positional coordinates of the transmission sources and a linear equation including the calculated positional coordinates of the reception sensors; and
   calculating a relative angle between the first object and the second object, the relative angle calculated as a crossed axes angle between a normal vector of the equation of the plane and a linear direction vector of the linear equation.

* * * * *